(12) United States Patent
Ward et al.

(10) Patent No.: US 11,867,585 B2
(45) Date of Patent: Jan. 9, 2024

(54) SYSTEM AND METHOD OF MONITORING THE OPERATION OF VIBRATING EQUIPMENT

(71) Applicant: Metso Outotec USA Inc., Waukesha, WI (US)

(72) Inventors: David Ward, Perth (AU); Jan Wirth, Seaforth (AU)

(73) Assignee: Metso Outotec USA Inc., Brookfield, WI (US)

( * ) Notice: Subject to any disclaimer, the term of this patent is extended or adjusted under 35 U.S.C. 154(b) by 36 days.

(21) Appl. No.: 17/830,740

(22) Filed: Jun. 2, 2022

(65) Prior Publication Data

US 2023/0393011 A1 Dec. 7, 2023

(51) Int. Cl.
*G01M 1/22* (2006.01)

(52) U.S. Cl.
CPC ..................... *G01M 1/22* (2013.01)

(58) Field of Classification Search
CPC ....................................................... G01M 1/22
See application file for complete search history.

(56) References Cited

U.S. PATENT DOCUMENTS

| | | | | |
|---|---|---|---|---|
| 4,754,870 A * | 7/1988 | Hallman | ................ | B65G 27/30 198/770 |
| 5,614,094 A * | 3/1997 | Deister | ..................... | B07B 1/46 210/392 |
| 7,614,306 B2 * | 11/2009 | Kuehl, II | ............ | G01M 99/005 73/649 |
| 2007/0267331 A1 | 11/2007 | Niklewski | | |
| 2009/0248360 A1 | 10/2009 | Garrison | | |

(Continued)

FOREIGN PATENT DOCUMENTS

| | | |
|---|---|---|
| CN | 201751530 U | 2/2011 |
| CN | 104438072 A | 3/2015 |

(Continued)

OTHER PUBLICATIONS

International Search Report and Written Opinion for International Patent Application No. PCT/US2023/067805, dated Sep. 13, 2023.

*Primary Examiner* — Kristina M Deherrera
*Assistant Examiner* — Jean F Morello
(74) *Attorney, Agent, or Firm* — Andrus Intellectual Property Law, LLP (57) ABSTRACT

A system for monitoring the operation of vibrating equipment, such as a vibrating screen unit or vibrating feeder. The vibrating equipment includes a series of mounting springs that support the body on a stationary support structure. The system includes a plurality of sensors that are positioned to detect vibrating forces on one or more of the mounting springs. Each of the sensors generates a monitoring signal that is received by a control unit. The monitoring signals are a measure of the resonance frequency of the mounting springs. The control unit is operable to compare the monitoring signals from the sensors to expected, normal values such that the control unit is able to determine whether the mounting springs are functioning in a normal manner or whether a problem exists. The control unit is further able to monitor the operation of the vibrating equipment through the analysis of the monitoring signals.

18 Claims, 5 Drawing Sheets

(56) References Cited

U.S. PATENT DOCUMENTS

2011/0016974 A1\* 1/2011 Wagner ............... G01M 13/045
73/579
2019/0339143 A1 11/2019 Jarvinen et al.
2020/0106437 A1 4/2020 Iso-Ketola et al.

FOREIGN PATENT DOCUMENTS

| | | | | |
|---|---|---|---|---|
| CN | 106540876 A | 3/2017 | | |
| CN | 104889053 B | 5/2017 | | |
| JP | 2014184412 A | 10/2014 | | |
| KR | 101086313 B1 | 11/2011 | | |
| WO | 2019006506 A1 | 1/2019 | | |
| WO | WO-2019006506 A1 \* | 1/2019 | ............. | B01D 33/00 |
| WO | WO-2019175746 A1 \* | 9/2019 | ............... | B07B 1/36 |

\* cited by examiner

SYSTEM AND METHOD OF MONITORING THE OPERATION OF VIBRATING EQUIPMENT

BACKGROUND

The disclosed system generally relates to vibrating equipment used for material processing and handling, such as vibrating screen units and vibrating feeders used for separating or transporting particulate feed material as to size, and more particularly to a system for monitoring the operation of the vibrating equipment to optimize the operation of the equipment and a facility including such equipment.

A vibrating screen unit is one type of vibrating equipment that is well known for separating particulate feed material into various size classes. Such units include a pair of separated, generally vertical side walls or plates which support at least one and preferably several transversely positioned decks of apertured screening media. When multiple screening decks are provided, the upper screen media has larger openings than those below. Upon generation of vibrating motion by a one or more motion generators, particles fed to the decks are caused to bounce so that smaller-sized particles fall through the openings in the screen media, and larger-sized particles remain upon the deck. Using multiple decks, operators are able to generate a product of classified material in several size ranges.

Such vibrating screen units are designed with a specified amplitude and velocity, which is a function of the configuration of the plates, the size and type of the vibrating motion generating device, the orientation of the plates and/or the screen decks, and fabrication and assembly techniques, among other factors well known in the art of designing and manufacturing such units. As a result, vibrating screen units of a particular model typically develop a fairly predictable system frequency upon operation, with individual units of a particular design developing small variations in system frequency from the model/design parameters. Over time, the system frequency of an individual unit often changes, influencing longevity and productivity. Designers attempt to design vibrating units so that they operate as far from the system frequency as practical while still maintaining desired production rates.

In the designing of such units, it is desired that the plates move synchronously, so that the screen decks are vibrated uniformly across the length of the deck. This synchrony not only enhances the classifying performance of the unit, it also prolongs operational life of the screen unit. When plates are not in synch, operationally-generated forces cause stress, among other places to attachment joints between the screen decks and the plates, and between the plates and laterally projecting spring mounts. Imbalanced units have shorter operational lives, require more frequent maintenance, and/or have less efficient classification performance.

Conventional vibrating screen units are provided with plates made of steel, which is strong in the axial direction. However, the plates are relatively thin in view of the production loads and work performed, and are susceptible to racking or twisting forces. Potentially damaging operational forces in vibrating screen units are caused, among other factors, by uneven or misaligned springs, uneven foundation mounts, improper vibrating speed, improperly installed screen decks, worn bushings and/or imbalanced flywheels on the vibration generator. Due to the wide variety of potential causes for vibrator unit malfunction, it is difficult for the average operator to detect when a unit is not operating according to its design parameters. It is even more difficult for the average operator to accurately diagnose the cause of the malfunction.

One possible area for failure or malfunction is within the mounting springs that are used to support the vibrating screen unit on a stationary support structure. In many cases, the vibrating screen unit includes a mounting flange positioned near both the feed end and the discharge end on each of the pair of spaced side walls. The mounting flange is designed to be aligned with similar support flanges on the stationary support structure. One or more resilient mounting spring are positioned between the mounting flanges and the support flanges to isolate the movement of the vibrating screen unit and the rigid support structure. Over a period of use, the characteristics of the mounting springs can begin to change, which affects the ability of the mounting springs to isolate the movement of the vibrating screen unit from the static support structure. In addition, if debris becomes lodged within the mounting spring, the operating characteristics of the mounting spring will adversely change, again affecting the ability of the mounting spring to isolate the movement of the vibrating screen unit.

In addition to vibrating screen units, vibrating feeders are used to transport material from an infeed end of the feeder to a discharge end of the feeder utilizing vibrating movement of the feeder body. A vibrating feeder does not separate material by size but rather utilizes the vibrating movement of the feeder to move material from one end of the feeder to the other, discharge end. Again, the feeder is mounted by one or more resilient mounting springs to isolate the movement of the feeder body from a rigid support structure.

The inventors have identified this problem and have developed a system and method to monitor the operation and function of the mounting springs to determine the functional characteristics of the mounting springs and to enhance the operation of the entire vibrating equipment.

SUMMARY

The present disclosure generally relates to a system and method for monitoring the operation of vibrating equipment, such as a vibrating screen unit or feeder that allows an owner/operator to monitor the operation of a plurality of mounting springs used to support the body of the vibrating equipment on a stationary support structure.

The vibrating equipment is designed to separate or move materials placed on the vibrating equipment during operation. The vibrating equipment includes a vibrating body that extends between a feed end and a discharge end. The vibrating body includes a pair of spaced side walls and at least one screen deck mounted between the pair of spaced side walls. In the case of a vibrating screen unit, each of the screen decks includes openings that allow material smaller than a determined size to pass through the screen deck such that the vibrating screen unit can separate a flow of material into different sized particles. In the case of a vibrating feeder, the feeder includes a support deck that vibrates to move material forward from the feed end to the discharge end of the vibrating body.

Each of the side walls of the vibrating body includes a first mounting flange positioned near the feed end of the vibrating body and a second mounting flange positioned near the discharge end of the vibrating body. The pair of first mounting flanges and second mounting flanges provide points of attachment to support the body of the vibrating equipment on a stationary support structure. The stationary support structure includes a corresponding number of support flanges that are each aligned with one of the mounting flanges on the vibrating body to support the side walls of the body. The vibrating equipment further includes one or more mounting springs that are positioned between each of the support flanges on the support structure and one of the first or second mounting flanges on the side walls of the vibrating body to create a resilient mount between the vibrating body and the support structure. The mounting springs isolate the vibration and movement of the vibrating body from the support structure during operation of one or more motion generators that are also included as part of the vibrating equipment.

The vibrating equipment of the present disclosure further includes a plurality of sensors, such as but not limited to force responsive sensors, that can be installed either as original equipment or as a retrofit kit. Each of the sensors is positioned in either direct or indirect contact with one or more of the mounting springs. The sensors each generate a monitoring signal based upon the vibrating forces applied to or sensed by the sensor by the mounting springs during operation. The monitoring signal generated by each of the sensors thus provides an indication of the vibrating forces applied to the monitoring springs during operation. In one contemplated embodiment of the present disclosure, the sensors are force responsive sensors positioned between a top end of one of the mounting springs and either one of the first mounting flanges or the second mounting flanges formed on the vibrating body. In a second contemplated embodiment, the force responsive sensors can be positioned between a bottom end of one of the mounting springs and a support flange that is formed as part of the support structure. Since the sensors are positioned between the mounting springs and either the mounting flanges on the screen body or the support flanges on the support structure, the sensors provide a monitoring signal that is created based upon the vibrating forces generated by the mounting springs during operation of the vibrating screen unit. Such vibrating forces are an indication of the resonance frequency of the mounting spring or springs being monitored.

In one contemplated embodiment of the present disclosure, the force responsive sensors are flat plate sensors that include electrical traces or coils that respond to the vibrating forces applied to either a top surface or a bottom surface of the sensor. Since the vibrating equipment utilizes one or more motion generators to create the vibration and movement required to move material, the sensors generate the monitoring signals based on the vibrating movement seen by each of the mounting springs. Each of the sensors can include either a direct wired connection or a wireless transmitter such that the sensor is able to both generate and transmit monitoring signals to a control unit. In the case of a wireless transmitter, the wireless monitoring signal would be transmitted utilizing wireless communication techniques, such as Bluetooth® or Wi-Fi.

The control unit of the vibrating equipment is operable to receive the monitoring signals from the plurality of sensors and to analyze the monitoring signals to determine the operational health of the mounting spring in contact with the sensor. The control unit can compare the monitoring signals, which are related to the resonance frequency of the mounting springs, to historic monitoring signals to detect a change in the operating characteristics of the mounting springs. Alternatively, the control unit can compare the monitoring signals from each of the sensors to determine whether one or more of the mounting springs is operating in an improper manner. In this manner, the control unit is able to detect problems in the operation of one or more of the mounting springs and signal when one of the mounting springs may need to be replaced, repaired or simply examined.

In addition to monitoring the health of each of the mounting springs, the control unit can utilize the monitoring signals to analyze the operation of the vibrating equipment. As an illustrative example, differences in the monitoring signals from the various sensors can be used by the control unit to detect an overload condition, uneven loading conditions or improper operation as compared to normal operating parameters. In this manner, the method and system of the present disclosure is able to not only monitor the operational health of each of the mounting springs but also to monitor the operation of the entire vibrating equipment.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
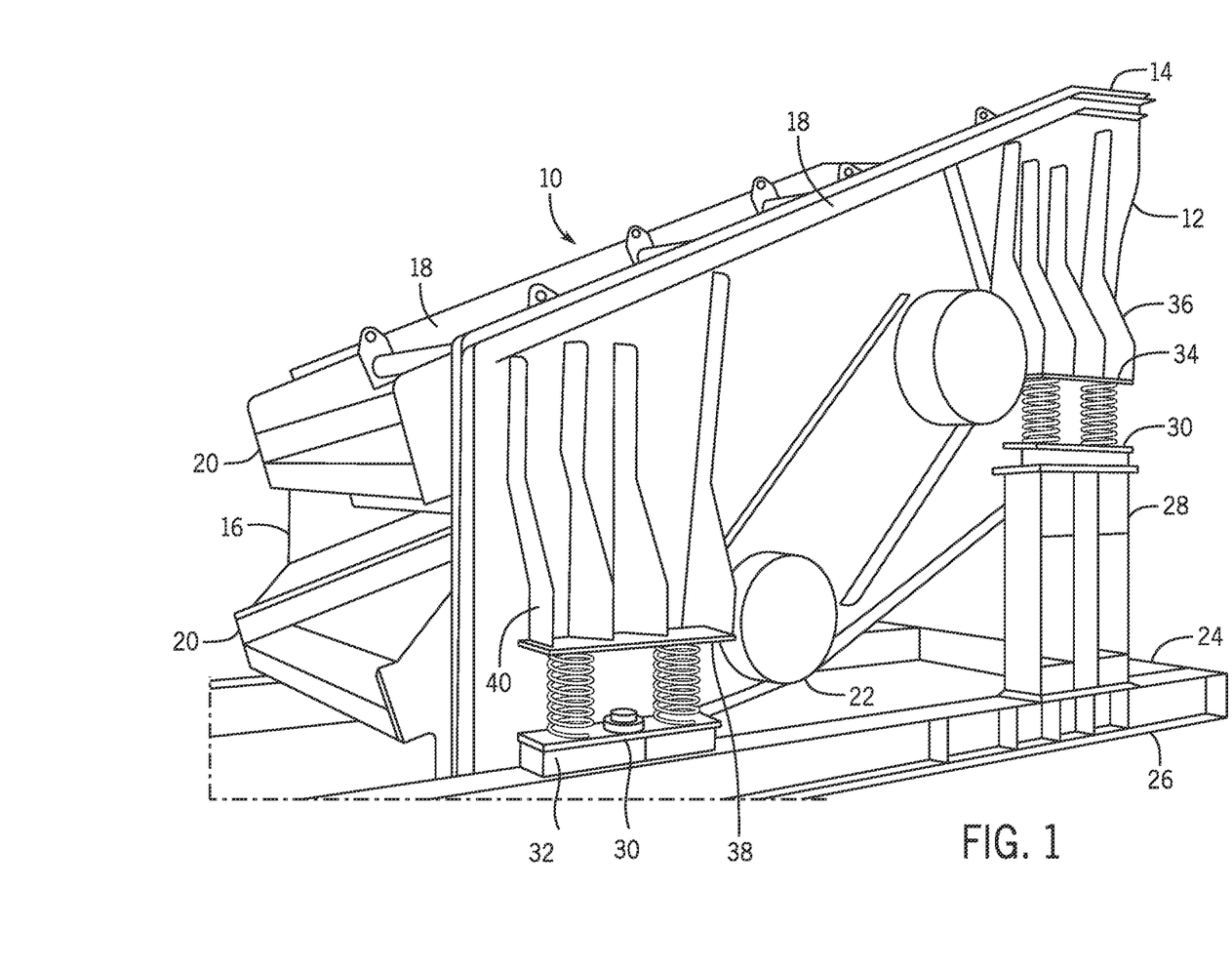
FIG. 1 is a front perspective view of a vibrating screen unit suitable for use with the monitoring system of the present disclosure.

FIG. 1 generally illustrates one type of vibrating equipment that can be monitored in accordance with the present disclosure, In the embodiment shown in FIG. 1, the vibrating equipment is a vibrating screen unit 10 that incorporates the system and method of the present disclosure. As an alternative, the vibrating equipment could be a vibrating feeder. In the present disclosure, the term vibrating equipment should be interpreted as a type of equipment that intentionally vibrates to move material from a feed end to a discharge end, such as but not limited to a vibrating screen unit or a vibrating feeder.

As illustrated in FIG. 1, the vibrating screen unit includes a vibrating body 12 that is generally declined from a feed end 14 to a discharge end 16. However, it is contemplated that the vibrating body could be horizontal or slightly inclined from the feed end 14 to the discharge end 16. The body 12 includes a pair of spaced side walls 18 that define the width of the vibrating screen unit 10. In the embodiment shown in FIG. 1, a pair of screen decks 20 are mounted between the pair of side walls 18. Each of the pair of screen decks 20 has different size openings to separate a material flow into product outlets that have different size particles. Although two screen decks 20 are shown in the embodiment of the FIG. 1, it should be understood that either one or more than two screen decks 20 could be utilized while operating within the scope of the present disclosure.

The vibrating screen unit 10 includes at least one motion generator 22 that is operable to impart vibrating, linear or elliptical motion to the entire vibrating screen unit. In the embodiment shown in FIG. 1, the motion generator 22 includes a pair of rotating shafts that each include a weighted eccentric that creates vibrating, shaking, linear or elliptical movement of the entire body 12 of the vibrating screen unit 10. Although one type of motion generator 22 is shown in FIG. 1, it should be understood that various different types of motion generators 22 could be utilized with the vibrating screen unit 10. As an example, the motion generator 22 could be mounted above the top edges of the side walls 18 and thus be a separate module that is mounted to the side walls 18 rather than incorporated into the side walls 18. In each embodiment, the movement created by the motion generator 22 causes the body 12 of the vibrating screen unit to move to help urge the movement of particles of material through the various screen decks 20.

As shown in FIG. 1, the vibrating screen unit 10 is mounted to a support structure 24. The support structure 24 is a stationary, rigid structure that is mounted to a ground surface or another stable support surface. The support structure 24 is both stationary and rigid and since the vibrating screen unit 10 is moving, the movement of the vibrating screen unit 10 must be isolated from the stationary support structure 24 to prevent damage to the stationary support structure 24 in the manner to be discussed below. In addition to the direct mounting between the body and some type of support structure 24, in other contemplated embodiments, an isolation frame can be located between the body and the support structure 24.

In the embodiment shown, the support structure 24 includes a base 26 and a pair of feed end support legs 28 positioned on each side of the vibrating screen unit 10. Each of the support legs 28 supports one of the side wall 18 near the feed end 14 of the vibrating screen unit. Each of the support legs 28 includes a generally planar support flange 30. The support flange 30 is a flat plate that provides a flat, stationary mounting platform for the feed end 14 of the vibrating screen unit 10.

The support structure 24 further includes reduced height discharge end support legs 32 on each side of the vibrating screen unit 10. In the embodiment shown, since the vibrating screen unit 10 is declined from the feed end 14 to the discharge end 16, the height of the discharge end support legs 32 is much less than the height of the feed end support legs 28 to create the inclined orientation of each of the pair of screen decks 20. The discharge end support legs 32 also each include a support flange 30, which provides a point of attachment for the body 12 of the vibrating screen unit. In other contemplated embodiments, the vibrating equipment could be either horizontal or slightly inclined from the feed end to the discharge end.

Figure 2:
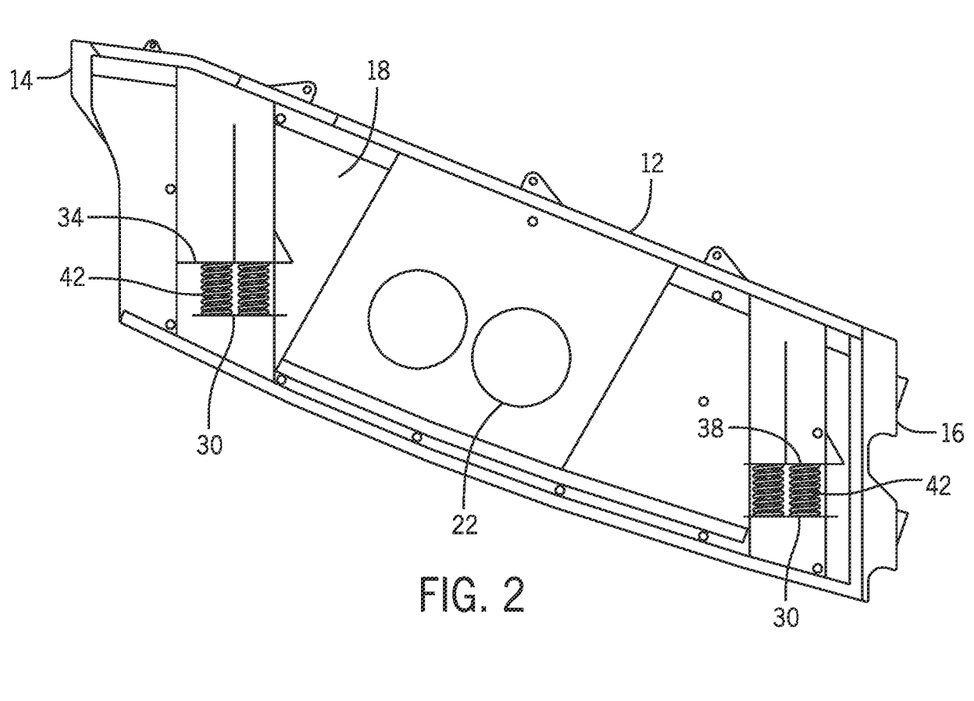
FIG. 2 is a side view of another embodiment of a vibrating screen unit suitable for use with the monitoring system of the present disclosure.

As can be seen in FIGS. 1 and 2, the feed end 14 of the body 12 includes a pair of first mounting flanges 34 that extend perpendicular from one of the generally planar side wall 18. The first mounting flanges 34 are each supported on the respective side wall 18 by a series of ribs 36 such that the generally horizontal first mounting flanges 34 can support the weight of the feed end 14 of the vibrating screen unit 10. At the discharge end 16, the body 12 includes a pair of second mounting flanges 38 that are each mounted to one of the side walls 18. The second mounting flanges 38 again are supported by a series of support ribs 40 such that the second mounting flanges 38 extend generally horizontally and provide a point of attachment between the body 12 and the support structure 24. As can be understood in FIGS. 1 and 2, the first mounting flanges 34 and the second mounting flanges 38 are similar in size and construction and each extend perpendicular to one of the pair of spaced side walls 18. In other contemplated embodiments of the vibrating equipment that can be used with the present disclosure, the mounting springs can be in different general locations, such as beneath the vibrating body, between side plates of the vibrating body or in other suitable locations.

As can be most clearly seen in FIG. 2, a pair of mounting springs 42 are positioned between one of the support flanges 30 included as part of the support structure 24 and either one of the first mounting flanges 34 or one of the second mounting flanges 38. The mounting springs 42 are used to isolate the movement of the vibrating equipment, such as the vibrating screen unit 10 shown, from the support structure 24, and specifically the support legs 28 and 32. During operation, the mounting springs have a resonance frequency that is directly related to the operation of the vibrating screen unit or feeder as a result of the motion generators. When the mounting springs 42 are operating properly, the mounting springs 42 absorb the horizontal and vertical movement of the body 12 of the vibrating screen unit 10 caused by the operation of the one or more motion generators 22. Since the support structure 24 is stationary, without proper isolation, the vertical and horizontal movement of the body 12 would create damage and cracking in the support structure during continuous use of the vibrating equipment. As described previously, the inventors of the present disclosure have developed a system and method for monitoring the proper operation of the series of mounting springs 42, the details of which will be discussed in detail below.

In another contemplated embodiment, the support structure 24 could be configured as an isolation frame that further aids in isolating the movement of the screen unit 10 from a ground or floor surface. In such an embodiment, the support structure would be mounted to the floor or ground by another series of mounting spring (not shown). In this contemplated embodiment, a first set of mounting springs would mount the vibrating screen unit to the isolation frame and a second set of mounting springs would mount the isolation frame to the ground or floor. In such an embodiment, the support structure would move and the ground or floor would be the stationary support structure for the system. The second set of mounting springs (not shown) in such an embodiment would isolate the vibrations present in the isolation frame from the stationary ground or floor to further isolate the vibrating movement of the screen unit from the ground or floor.

Figure 3:
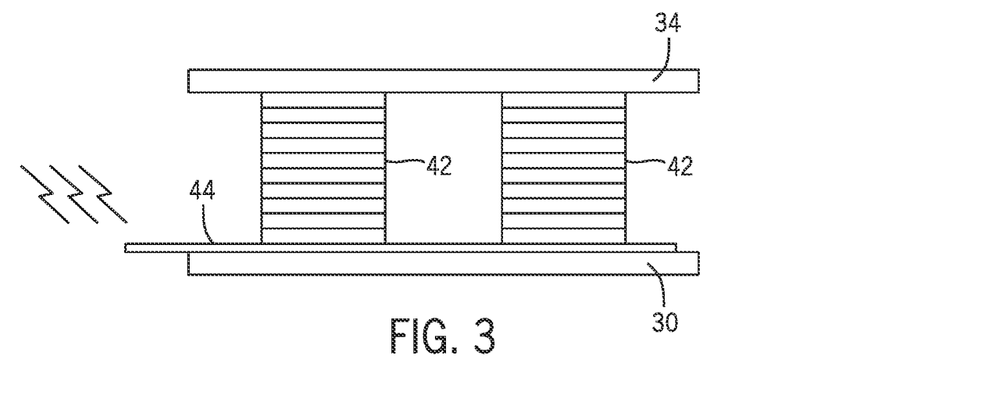
FIG. 3 is a schematic side view of a first contemplated location for the sensor of the monitoring system of the present disclosure.

FIG. 3 illustrates a first embodiment of the monitoring system of the present disclosure. In the embodiment shown in FIG. 3, the pair of mounting springs 42 are shown positioned between the first mounting flange 34 near the feed end of the vibrating screen unit and the support flange 30 of the support structure. It should be understood that the configuration of the mounting springs 42 is present at each of the mounting locations between either the first mounting flanges 34 or the second mounting flanges 38 and the support flanges 30 formed on the support structure. As indicated above, the mounting springs 42 provide a resilient attachment between the body of the vibrating screen unit and the support structure. Although two separate mounting springs 42 are shown, it is contemplated that the two mounting springs could be replaced by either a single mounting spring or more than two mounting springs 42. In addition, although coil springs are shown, it is contemplated that other types of springs or resilient mounts are contemplated as being within the subject matter of the present disclosure. As a non-limiting example, the mounting springs could be laminated springs, leaf spring, rubber springs, air springs or other similar types of resilient mounts.

In accordance with the present disclosure, a sensor 44 is incorporated in a location to detect the vibrating movement imparted to the mounting springs 42 as a result of the intentional movement of the vibrating body of the vibrating equipment. The sensors are sensors that detect vibrating or oscillating forces applied to the mounting springs during operation of the vibrating equipment, as compared to weight sensors that detect a force generate by the weight of material on the vibrating equipment. The sensors 44 can be various different types of sensors that can detect the resonance frequency of the mounting springs 42 during the movement of the vibrating body of the vibrating equipment. As an example, the sensors could be force responsive sensors in contact with the mounting springs 42, wire elongation sensors mounted to the mounting springs 42 or any other type of sensor that is able to detect the resonance frequency of the mounting springs 42.

In the embodiment shown in FIG. 3, the sensor 44 is a force responsive sensor positioned between and in contact with the mounting springs 42 and the support flange 30. The force responsive sensor 44 is a flat plate sensor including rubber upper and lower surfaces and a series of internal metallic coils or wire traces. The force responsive sensor 44 is a flat plate sensor having flexible rubber top and bottom surfaces that encapsulate a sensor matrix that is able to accurately measure oscillating or changing force, pressure and balance in real time. The force responsive sensor includes integrated hardware and software that allows the sensor to generate a monitoring signal based upon the oscillating or vibrating forces applied to the top surface of the force responsive sensor by the mounting spring. Since the force responsive sensor 44 is positioned between the mounting springs 42 and the support flange 30, the force responsive sensor 44 will generate a monitoring signal that is directly related to the forces applied to the top surface of the force responsive sensor 44 by the mounting springs 42. These forces are an indication of the resonance frequency of the mounting springs 42 during operation. In the embodiment illustrated, the force responsive sensor 44 includes a power supply and a wireless transmitter that generates a wireless signal to relay the monitoring signal created by the force responsive sensor. In another contemplated embodiment, the force responsive sensor could included a wired connection that would then be hardwire connected to a terminal or data port to receive the monitoring signal from the sensor.

Figure 4:
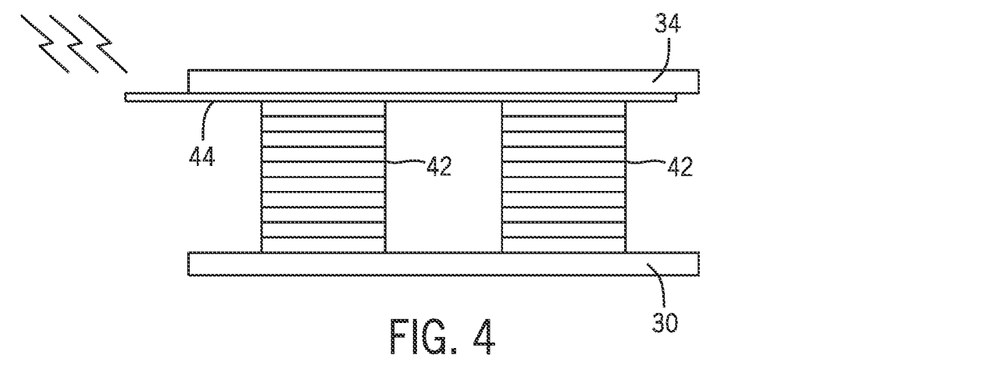
FIG. 4 is a schematic side view of a second contemplated location for the sensor of the monitoring system of the present disclosure.

FIG. 4 illustrates a second contemplated embodiment to utilize the force responsive sensor 44. In this embodiment, the force responsive sensor 44 is positioned between a top end of each of the two mounting springs 42 and the first mounting flange 34. Once again, a similar arrangement is contemplated for use between the mounting springs 42 and the second mounting flange 38 located near the discharge end 16 of the vibrating screen unit. The force responsive sensor 44 shown in FIG. 4 is identical to the force responsive sensor 44 shown in FIG. 3. Since the force responsive sensor 44 senses the forces created by the mounting springs 42, the position of the force responsive sensor 44 as shown can be used to generate a monitoring signal to monitor the operation of each of the pair of mounting springs 42.

Figure 5:
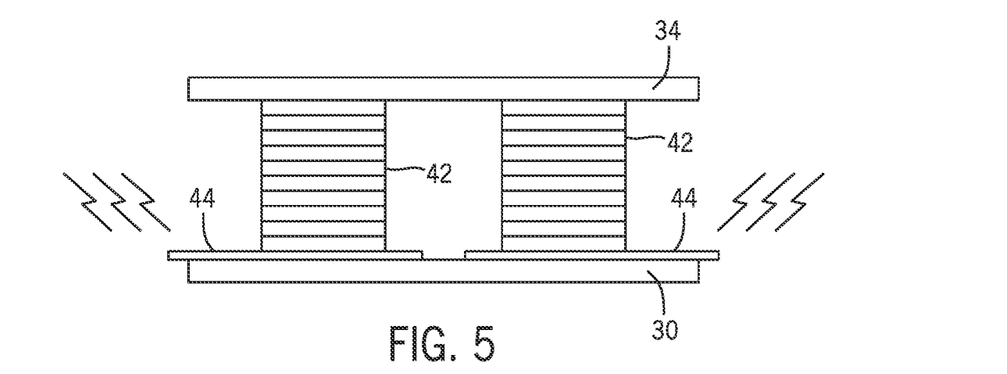
FIG. 5 is a schematic side view of a third contemplated location for the sensor of the monitoring system of the present disclosure.

FIG. 5 illustrates yet another contemplated alternate embodiment. In the embodiment shown in FIG. 5, two separate force responsive sensors 44 are used in place of the single force responsive sensor 44 shown in FIG. 3. In the embodiment of FIG. 5, a first force responsive sensor is positioned between the first mounting spring 42 and the support flange 30 while a second force responsive sensor 44 is positioned between the second mounting spring 42 and the support flange 30. In this contemplated embodiment, the two force responsive sensors 44 would each generate a monitoring signal which can be received and interpreted by a control unit in a manner to be described in greater detail below. In such an embodiment, four separate monitoring signals would be generated, one for each of the mounting springs 42.

In an embodiment in which the support structure is and isolation frame supported above the ground or a floor by a second set of mounting springs, sensors could be positioned between the isolation frame and the mounting spring or between the mounting spring and the stationary support structure, which is the ground or a floor. As with the illustrated embodiment, the sensors 44 would be able to generate a monitoring signal that is related to the vibration of the mounting spring as sensed by the sensor 44.

Although not shown in the Figures, it is contemplated that the sensors 44 could be other types of sensors that can be positioned in any location that would be able to detect the forces applied to the mounting spring that is being monitored by the sensor. The sensor must be located such that the vibrating or oscillating forces applied to the mounting spring due to the movement of the vibrating body during operation can be detected to generate the monitoring signal that is related to the resonance frequency of the mounting spring being monitored. For example, the sensors 44 could be a wire elongation or wire strain sensor that is mounted directly to the mounting spring to generate a monitoring signal related to the movement of the mounting spring and thus the resonance frequency of the mounting spring.

In the embodiment shown in FIGS. 3-5, each of the sensors 44 is shown and described as transmitting the monitoring signal utilizing a wireless communication technique, such as Bluetooth®. However, it is contemplated that the sensor 44 could communicate utilizing other wireless transmission techniques, such as Wi-Fi or Zigbee. In yet another contemplated embodiment, each of the sensors 44 could be hard-wired and would then communicate the monitoring signal utilizing a wired communication technique. In an embodiment utilizing a wired communication line between each of the sensors 44 and a monitoring terminal or gateway, the monitoring signals could then be analyzed either at nearby location or transmitted to a remote location for analysis and review.

As can be understood in FIGS. 3-5, the sensors 44 are separate components that are positioned between the vibrating equipment and the stationary support structure without any required modifications to either the vibration equipment or the stationary support structure. Thus, the sensors 44 could either be included when the vibrating equipment is initially installed or as a retrofit system. The sensors 44 could be provided as a retrofit for existing units that would allow for improved and enhanced monitoring of the operation of the mounting springs and the entire vibrating equipment. Once the sensors 44 are installed, the sensors will generate the monitoring signals for use by the control unit in determining the current operation of the vibrating equipment.

Figure 6:
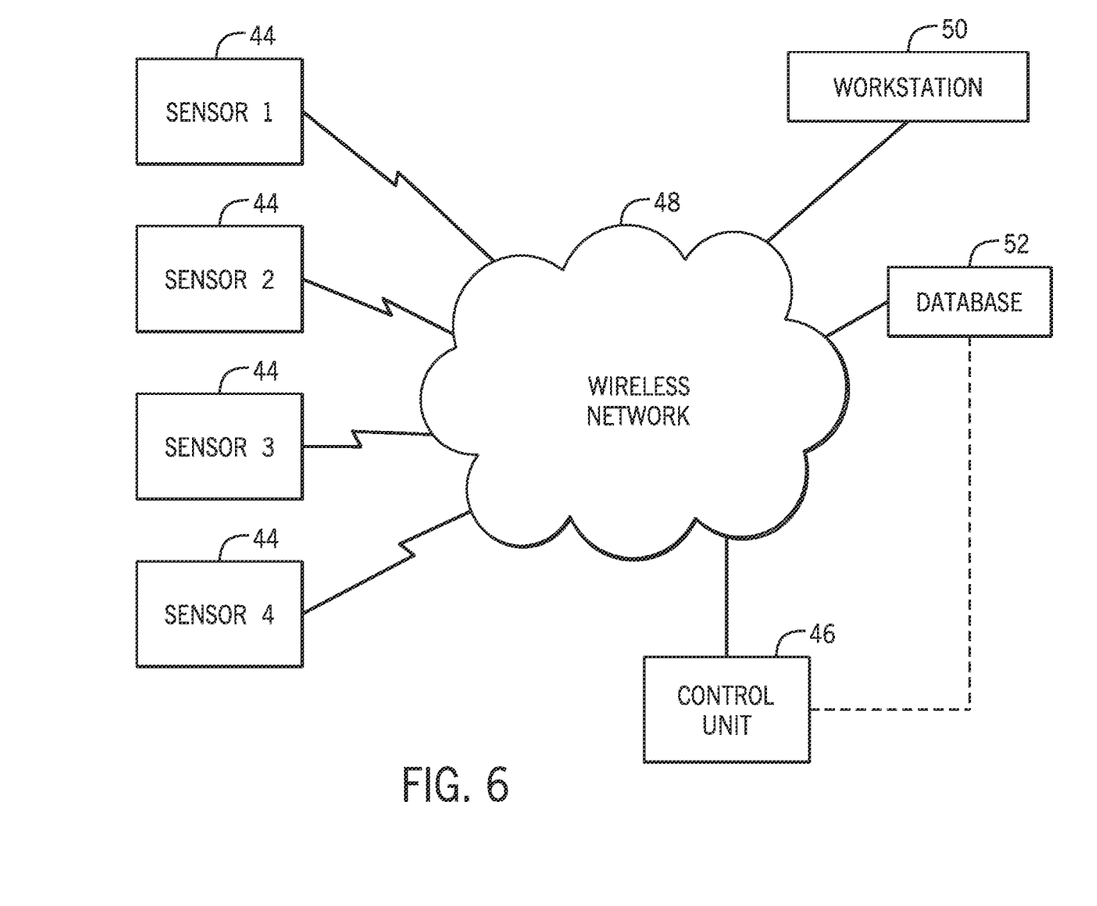
FIG. 6 is schematic illustration of the communication between the sensors and a control unit.

FIG. 6 illustrates one possible type of communication between the individual sensors 44 and the control unit 46. The control unit 46 is shown located remotely from the location of the sensors 44. However, in an embodiment in which the sensors 44 are hardwired to the control unit 46, the control unit 46 would be located near the sensors to facilitate hardwiring. In the embodiment shown in FIG. 6, a wireless communication network 48 provides the communication between the sensors 44 and the control unit 46. It is contemplated that the wireless network 48 could be a Wi-Fi network, a Bluetooth® communication link, a Zigbee communication link or any other type of communication link that would allow the monitoring signals from each of the sensors 44 to be received by the control unit 46. The control unit 46 could be any type of device that is able to receive the monitoring signals from the sensors 44 and process the monitoring signal. As an example, the control unit 46 could be a tablet, laptop computer, desk top computer, a monitoring device connected to a communication cloud or a processor connected directly to the sensors 44. The control unit 46 is meant to signify any type of computing device that can analyze the monitoring signals from the sensors from any location.

Figure 7:
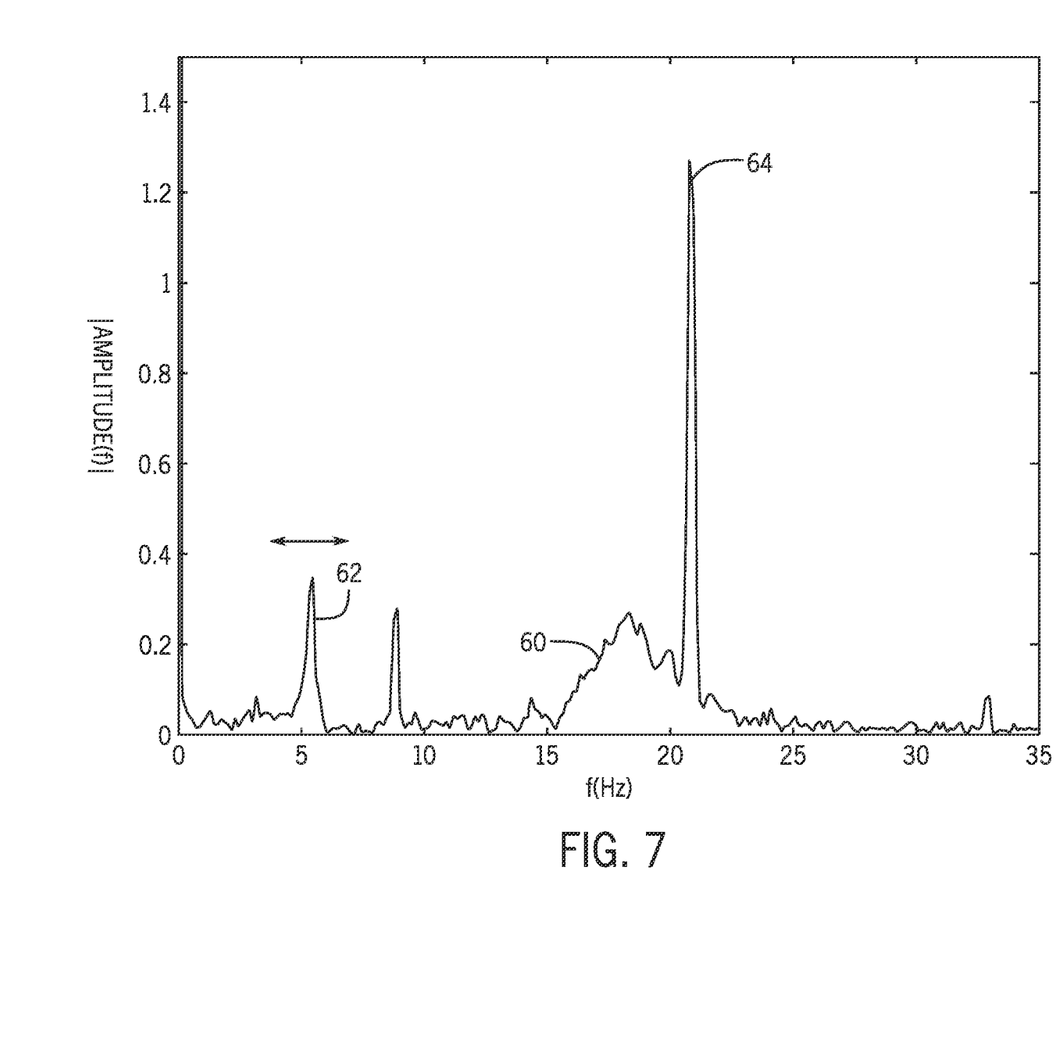
FIG. 7 is a trace of one monitoring signal from one of the sensors of the monitoring system of the present disclosure.

FIG. 7 illustrates a representative trace for the monitoring signal from any one of the sensors 44. The trace shown in FIG. 7 is meant for illustrative purposes only and the actual values and signals would be different depending upon the specific configuration of the vibrating equipment. The trace shown in FIG. 7 include a monitoring signal 60 from one of the sensors 44. The monitoring signal 60 includes a first peak 62 at approximately 5 Hz, which represents the natural frequency of the vibrating equipment mass and the spring system. The monitoring signal 60 also includes a peak 64 at just over 20 Hz, which is the operating frequency of the screen.

During operation of the vibrating equipment, a change or movement of the natural frequency peak 62 will provide an indication of a problem with the mounting spring. Thus, if the peak 62 begins to increase or decrease in frequency, such change will indicate a possible problem with the spring or that some type of debris is lodged within the spring.

Since the control unit receives monitoring signals from each of the sensors 44, the control unit can compare the monitoring signals 60 from the sensors to determine other operating characteristics of the vibrating equipment. For example, the control unit could determine whether the load is balanced by comparing the monitoring signals from the left and right sides of the vibrating equipment.

Once the control unit 46 receives the monitoring signals from the sensors 44, the control unit 46 can compare the monitoring signals to expected or known historic values recorded from each of the sensors 44 to determine whether the force responsive sensors 44 are detecting an abnormal operating condition. As an illustrative example, if a piece of rock or debris is caught between the coils of the individual mounting springs, such debris will cause the monitoring signal from the sensor associated with the mounting spring to generate the monitoring signal that is much different than expected. When the control unit 46 senses such change in the monitoring signal, the control unit can generate an alarm or notification signal. This alarm or notification signal can be received and displayed at a work station 50 or can be displayed at a local screen or monitor. The work station 50 can communicate through the same wireless network 48 and thus can be located at a location remote from both the force responsive sensors 44 and the control unit 46. The user/operator at the work station 50 can receive the alert or monitoring information from the control unit 46 and can then observe or check on the operation of the vibrating screen unit to correct any error or significant deviation that is determined by the control unit 46.

As another illustrative example, if one of the mounting springs begins to wear or deteriorate due to age, the monitoring signal from the mounting spring will begin to change and will be different from historic signals from that mounting spring and relative to other of the mounting springs. If the control unit 46 detects such changes, an alert would be sent to check the mounting spring for possible replacement.

In the embodiment shown in FIG. 6, a historic database 52 can be used to store previously recorded monitoring signals for use by the control unit 46 in comparing a current monitoring signal to a historic monitoring signal. Although the historic database 52 is shown connected to the wireless network, it is contemplated that the control unit 46 could be connected directly to the historic database 52 as shown by the dashed line in FIG. 6. The historic database 52 allows the system to store normal, acceptable operating conditions from each of the sensors and compare current operating conditions to the stored information. In this manner, the control unit 46 is able to generate alerts and notifications of when the vibrating screen unit is operating outside of normal, anticipated parameters.

In addition to determining when an immediate problem is occurring with one of the mounting springs, the control unit is able to monitor the monitoring signals from each of the sensors 44 to determine when any one of the mounting springs 42 begins to fail due to extended periods of use or upon a catastrophic failure due to external conditions. Once again, the control unit 46 can compare the present monitoring signal from each of the sensors 44 to historic values and when the present monitoring signal is out of expected ranges, the control unit 46 can generate an alert or message on the work station 50.

In addition to monitoring values from the vibration sensor 44, the control unit 46 can also identify if the spring is operating at the spring resonant frequency. If the spring is operating at the resonant frequency, such operation can signal a problem with the mounting spring that should be addressed and an alarm or alert should be generated.

In addition to monitoring each of the individual springs to detect a fault or possible failure, the control unit can also determine the distribution of material on the vibrating feeder deck or vibrating screens based on the monitoring signals to determine whether there is a distribution issue. Since the control unit will be monitoring the signals from sensors located at each of the four corners of the vibrating equipment, the control unit can compare the monitoring signals to determine whether there is uneven distribution of material on the screen or feeder. Uneven distribution may be caused by a failure in the feed device which will cause an overworking of the mounting springs on one side of the vibrating equipment.

Still further, the control unit 46 receives monitoring signals from each of the vibration sensors 44 and can use artificial intelligence to monitor changes in the monitoring signals. The artificial intelligence included in the control unit 46 can be used to detect changes in the operation of the monitoring springs, which may provide information as to predicted failure of the mounting springs or uneven or non-optimized operation of the vibrating equipment. Since each of the vibration sensors 44 will be generating a monitoring signal in real-time during operation of the vibrating screen unit, the control unit 46 can make real time determinations as to the operating efficiency of not only the individual mounting springs but the entire vibrating screen unit.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for monitoring the operation of vibrating equipment that is mounted to a plurality of mounting springs, the system comprising:
   a plurality of sensors, each of the sensors being configured to detect a resonance frequency of at least one of the mounting springs during vibrating movement of the vibrating equipment, each of the sensors being operable to generate a monitoring signal;
   a control unit configured to receive the monitoring signals from the plurality of sensors, wherein the control unit is operable to determine proper functioning of each of the plurality of mounting springs based on the monitoring signals; and
   wherein each of the plurality of sensors generates the monitoring signal based on the movement of the one or more springs in contact with the sensor.

2. The system of claim 1 wherein each of the sensors is a force responsive sensor configured to be positioned between a vibrating screen unit and one of the mounting springs.

3. The system of claim 1 wherein the vibrating equipment is mounted to a support structure and each of the sensors is a force responsive sensor configured to be positioned between the support structure and one of the mounting springs.

4. The system of claim 3 wherein the support structure is mounted to a floor or ground through a second plurality of mounting springs and the plurality of sensors detect a resonance frequency of at least one of the mounting springs of the second plurality of mounting springs.

5. The system of claim 1 wherein each of the sensors includes a wireless transmitter operable to transmit the monitoring signal wirelessly to the control unit.

6. The system of claim 1 wherein the control unit is operable to determine at least one operating state of the vibrating equipment based on the monitoring signals from the sensors.

7. The system of claim 1 wherein the plurality of sensors are configured to be installed after installation of the vibrating equipment.

8. The system of claim 1 further comprising a workstation located remotely from the control unit such that operation of the vibrating equipment and the plurality of mounting springs can be reviewed remotely from the vibrating equipment.

9. Vibrating equipment for moving material, the vibrating equipment comprising:
   a vibrating body extending between a feed end and a discharge end, the vibrating screen body including at least a pair of spaced side walls and at least one deck mounted between the pair of spaced side walls;
   a support structure configured to support the vibrating body;
   one or more mounting springs positioned to create a resilient mounting between the vibrating body and the support structure; a motion generator operable to impart movement to the vibrating body; and
   a plurality of sensors each configured to detect a resonance frequency of the one or more mounting springs during the movement created by the motion generator, each of the sensors being operable to generate a monitoring signal, wherein each of the plurality of sensors generates the monitoring signal based on the movement of the one or more springs in contact with the sensor.

10. The vibrating equipment of claim 9 wherein the sensors each detects the operation of the at least one mounting spring and transmits the monitoring signal to a control unit.

11. The vibrating equipment of claim 10 wherein the sensors each include a wireless transmitter to wirelessly transmit the monitoring signal.

12. The vibrating equipment of claim 10 wherein the sensors are each force responsive sensors positioned between the one or more mounting springs and the support structure.

13. The vibrating equipment of claim 10 wherein the sensors are each force responsive sensors positioned between the one or more mounting springs and the vibrating body.

14. The vibrating equipment of claim 10 wherein the control unit is operable to monitor the operation of each of the mounting springs and the vibrating body.

15. The vibrating equipment of claim 10 wherein the control unit is operable to monitor the operation of the motion generator based on the monitoring signals from the plurality of sensors.

16. A method of monitoring the operation of vibrating equipment having a vibrating body supported by a plurality of mounting springs, comprising the steps of:
   positioning one of a plurality of sensors between at least one of the plurality of mounting springs and either a support structure or a vibrating screen unit in operative communication with each of the plurality of mounting springs such that the sensor detects forces applied to the mounting spring;
   operating a motion generator to impart movement to the vibrating body;
   generating a monitoring signal from each of the sensors during operation of the motion generator, wherein the monitoring signal is a resonance frequency of the mounting spring determined based on the vibrating forces applied to the mounting spring;
   transmitting the monitoring signals to a control unit;
   receiving the monitoring signals at the control unit during operation of the motion generator;
   operating the control unit to analyze the operation of each of the plurality of mounting springs.

17. The method of claim 16 further comprising the steps of:
   comparing the monitoring signals from the plurality of sensors to acceptable values for the vibrating equipment; and
   providing an indication of operation of the vibrating equipment based on the comparison.

18. The method of claim 16 wherein the control unit is operable to analyze operating characteristics of the vibrating equipment based on the monitoring signals.

* * * * *